United States Patent [19]

Stockl et al.

[11] Patent Number: 4,883,714
[45] Date of Patent: Nov. 28, 1989

[54] INK COMPOSITIONS AND PREPARATION

[75] Inventors: Rebecca R. Stockl; Kenneth R. Barton; Melvin A. Caldwell, all of Kingsport, Tenn.

[73] Assignee: Eastman Kodak Company, Rochester, N.Y.

[21] Appl. No.: 295,086

[22] Filed: Jan. 9, 1989

Related U.S. Application Data

[63] Continuation-in-part of Ser. No. 50,645, May 18, 1987, abandoned.

[51] Int. Cl.$^4$ .............................................. C09D 11/10
[52] U.S. Cl. ..................................... 428/412; 428/195; 428/211; 428/430; 428/458; 428/475.2; 428/478.8; 428/479.3; 428/481; 428/483; 428/474.4; 524/88; 524/90; 524/155; 524/159; 524/160; 524/176; 524/190; 524/239; 524/503; 524/602; 524/603
[58] Field of Search ................. 524/503, 603, 602, 88, 524/90, 155, 159, 160, 176, 190, 239; 428/412, 195, 211, 430, 458, 474.2, 475.2, 478.8, 479.3, 481, 483

[56] References Cited

U.S. PATENT DOCUMENTS

| | | | |
|---|---|---|---|
| T949,001 | 2/1975 | Pacifici | 427/341 |
| 3,563,942 | 2/1971 | Heiberger | 524/603 |
| 3,734,874 | 5/1973 | Kibler | 524/603 |
| 3,779,993 | 12/1973 | Kibler | 524/603 |
| 4,148,779 | 4/1979 | Blackwell | 524/603 |
| 4,156,073 | 5/1979 | Login | 524/503 |
| 4,233,196 | 11/1980 | Sublett | 524/603 |
| 4,304,901 | 12/1981 | O'Neill | 524/603 |
| 4,704,309 | 11/1987 | Coney | 427/258 |

FOREIGN PATENT DOCUMENTS 57-10663 1/1982 Japan .
2097005 10/1982 United Kingdom .

*Primary Examiner*—C. Warren Ivy
*Attorney, Agent, or Firm*—Thomas R. Savitsky; William P. Heath, Jr.

[57] ABSTRACT

An aqueous printing ink or its semi-aqueous or non-aqueous concentrate exemplified as comprising a substantially homogeneous system of the components:

(1) from about 4 to about 80 weight % of one or more polyester materials having an acid component of from about 75 to about 84 mole % isophthalic acid and conversely from about 25 to about 16 mole % 5-sodiosulfoisophthalic acid, and having a glycol component of from about 45 to about 60 mole % diethylene glycol and conversely from about 55 to about 40 mole % 1,4-cyclohexanedimethanol or ethylene glycol or mixtures thereof;
(2) from about 1 to about 60 weight % of pigment material;
(3) from substantially none to about 90 weight % of water; and
(4) from about 0.05 to about 30.0 weight % of polyvinyl alcohol.

15 Claims, No Drawings

INK COMPOSITIONS AND PREPARATION

This application is a continuation-in-part of application Ser. No. 050,645, filed May 18, 1987, now abandoned.

TECHNICAL FIELD

This invention concerns pigmented, aqueous inks and their substantially non- or semi-aqueous concentrates, containing partially or essentially completely hydrolyzed polyvinyl acetate, hereinafter termed polyvinyl alcohol, and having greatly improved printing properties such as flow-out, print smoothness, transparency, gloss, color development, and the like, particularly noticeable with highly colored pigments, wherein the pigment carrier or binder comprises water-dispersible or dissipatible polyester material. These inks find special utility for letter press, intaglio, gravure, flexographic and other printing processes adaptable to the use of aqueous inks. The term "ink" is used herein in its broad sense as including the use thereof for coatings in all forms such as letters, patterns and coatings without design.

BACKGROUND OF THE INVENTION

The printing industry in general finds many applications for the use of water-based inks and overprint varnishes as a means of meeting increasingly stringent solvent effluent regulations. Present day water-based inks often fail to satisfy these regulations as well as the necessary printability, stability, and performance properties required for commercial inks. For example, the various ethylene-acrylic acid copolymer salts of U.S. Pat. No. 3,607,813, the disclosure of which is incorporated herein by reference (for the printing process descriptions therein), in addition to requiring complex polymer and ink preparations, lack in performance on certain substrates. Other such aqueous or semi-aqueous systems proposed for printing inks contain polymers such as styrene-butadiene or polyacrylate latex systems, but these systems also have serious drawbacks including being non-water dispersible after short drying periods which complicates equipment clean up. Other water soluble or dispersible polymers suggested for printing ink use are discussed in U.S. Pat. No. 4,072,644.

The present invention provides marked improvements in the preparation, stability, and performance of water-based inks for printing and coating, particularly in regard to flow-out, wet-out, viscosity modification, color development, reduction in surface tension, pick-up on the printing rollers or other mechanisms, and greatly improved adhesion on certain substrates such as aluminum. In particular, the inks of the present invention containing polyvinyl alcohol have a substantial increase in optical density as compared to a comparable, control ink without polyvinyl alcohol when flexo printed onto polyethylene. These improvements are particularly dramatic in comparison to the effects of known additives such as hydroxyethylcellulose and the like on aqueous inks.

DESCRIPTION OF THE INVENTION

Different printing methods demand different ink properties and different formulations. Gravure inks transfer directly from the engraved cylinder to the substrate, whereas flexographic (or "flexo") inks must transfer from an anilox cylinder to a plate to the substrate on a simple press, and from the anilox cylinder to rubber rollers to the plate to the substrate on more complicated presses. At each transfer, the ink is subjected to very high shear conditions. In addition, the ink must fully wet all the materials it contacts. Additives are used to increase viscosity, modify rheology and lower surface tension to improve printing and transfer, particularly in flexo printing.

Flexo printing is best done at viscosities in excess of 25 sec. #2 Zahn. Polyvinyl alcohol can increase viscosity of certain media. Thus, we have found that flexo printing can be improved by an increase in viscosity due to polyvinyl alcohol. Polyvinyl alcohols can also lower the surface tension of certain media. Thus, we have found that wet-out and flexo transfer of inks with polyvinyl alcohols are improved, particularly where the surface tension is lowered significantly (20–40 dynes/cm).

However, in addition to the above, improvements in both printability and flexo transfer are observed in certain inks of the present invention where no substantial concomitant change in viscosity and/or surface tension can be measured. This effect is most pronounced in flexo printing on polyethylene.

This invention demonstrates an unexpected synergism of water-dissipatable polyester and polyvinyl alcohol. The invention is defined as a composition useful as a printing ink or concentrate thereof comprising a substantially homogeneous system of the components:

(1) from about 4 to about 80 weight % of polymeric material of at least one linear water-dissipatable polymer having carbonyloxy linking groups in the linear molecular structure wherein up to 80% of the linking groups may be carbonylamido linking groups, the polymer having an inherent viscosity of from about 0.1 to about 1.0, preferably from about 0.1 to about 0.5 measured in a 60/40 parts by weight solution of phenol/tetrachloroethane at 25° C. and at a concentration of 0.25 gram of polymer in 100 ml of the solvent, the polymer containing substantially equimolar proportions of carboxylic acid equivalents (100 mole percent) to hydroxy and amino equivalents (100 mole percent), the polymer comprising the reaction products of (a), (b), (c), and (d) from the following reactants or ester forming or ester-amide forming derivatives thereof;

(a) at least one difunctional dicarboxylic acid;

(b) from about 4 to about 25 mole percent, based on a total of all acid, hydroxyl and amino equivalents being equal to 200 mole percent, of at least one difunctional sulfomonomer containing at least one metal cationic group attached to an aromatic or cycloaliphatic nucleus wherein the functional groups are hydroxy, carboxyl or amino;

(c) at least one difunctional reactant selected from a glycol or a mixture of a glycol and diamine having two -NRH groups, the glycol containing two —CH$_2$—OH groups of which (1) at least 15 mole percent based on the total mole percent of hydroxy or hydroxy and amino equivalents, is a poly(ethylene glycol) having the structural formula

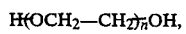
H(OCH$_2$—CH$_2$)$_n$OH, n being an integer of from 2 to about 20, or (2) of which from about 0.1 to less than about 15 mole percent based on the total mole percent of hydroxy or hydroxy and amino equivalents, is a poly(ethylene glycol) having the structural formula

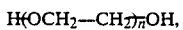

n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —C(R)$_2$—OH group, an aminocarboxylic acid having one -NRH group, and an amino-alcohol having one —C(R)$_2$—OH group and one —NRH group, or mixtures of said difunctional reactants;

wherein each R in the (c) or (d) reactants is a H atom or an alkyl group of 1 to 4 carbon atoms;

(2) from about 1 to about 60 weight % pigment material;

(3) from substantially none to about 90 weight % water; and (4) from about 0.05 to about 30.0 weight % polyvinyl alcohol (PVA), wherein said ink, when printed by a flexographic process onto polyethylene having a surface energy of about 37–39 dynes/cm, has improved printability relative to a control ink without polyvinyl alcohol such that said ink has an increase in optical density relative to the control ink on said polyethylene of at least 100% wherein increase in optical density =

$$\frac{(\text{optical density of ink} - \text{optical density of control ink})}{\text{optical density of control ink}} \times 100.$$

The optical density of the inks printed onto polyethylene can be measured by any suitable means known in the art, e.g., by use of a suitable densitometer such as a Macbeth Densitometer. The control ink is substantially the same as the sample ink (i.e., ink of the invention) except that the control ink has no polyvinyl alcohol.

It is preferred that the increase in optical density of the ink of the present invention printed on polyethylene is at least 300%, more preferred is at least 500%, and most preferred is at least 700%.

The inks of the present invention also have an unexpected improvement in flexographic transfer. This improvement in flexographic transfer can be shown by measuring the optical density of the ink of the present invention after flexographic printing onto a suitable substrate such as clay-coated paper and comparing the optical density to the optical density of a control having no PVA, that is treated in the same manner. The % increase in optical density is then determined as described above for flexo printing onto polyethylene. Such a percent increase in optical density is an index of improved flexo transfer since aqueous inks readily wet-out on substrates such as paper and wet-out effects as seen on polyethylene of low surface energy are substantially insignificant on paper. The % increase in optical density of the inks of the present invention in flexographic printing on paper is at least 1%, prefereably at least 5%, more preferably at least 10%, and most preferably at least 50%.

In the above polymeric material it is preferred that very minor, e.g., less than about 10 mol % based on all reactants, of reactant (d) is employed, that at least about 70 mol % of reactant (c) is glycol, and that at least about 70 mol % of all the hydroxy equivalents is present in the glycol.

The polyvinyl alcohols (PVA's) useful in the present invention are those of partially hydrolyzed (from about 85% to about 95% hydrolyzed) polyvinyl-acetate which have low, medium, or high viscosities (CPS, determined on 4% aqueous solutions at 20° C. by ASTM D-2196) of from about 2 to about 55 CPS, preferably from about 37 to about 52 CPS. The preparation and properties of such PVA materials are well known in the literature as described, for example, in Kirk-Othmer, Concise Encyclopedia of Chemical Technology, 3rd Edition, 1984, pp. 848–865, incorporated herein by reference.

Typical examples of polyvinyl alcohols useful in the present invention are commercially available from Air Products & Chemicals, Inc., Allentown, PA, and are known by the trademark Vinol. Vinol polyvinyl alcohol is manufactured from polyvinyl acetate by methanolysis. Individual Vinol grades vary in molecular weight and degree of hydrolysis. Changes in the molecular weight affect solution viscosity. Therefore, the molecular weight is specified by the viscosity of a 4% aqueous solution. The viscosities are classified as low, medium, and high; while degree of hydrolysis is commonly denoted as super, fully, intermediate and partially hydrolyzed. Vinol 125 polyvinyl alcohol, for example, is a super hydrolyzed, medium viscosity grade. Nine different standard grades are available.

The more useful concentration range of the PVA in the inks is from about 0.05 to about 15.0, and the more preferred concentrations range from about 0.05 to about 3.5 wt. %, and most preferably from about 0.2 to about 2.0 wt. %, said percentages being based on the total weight of the ink. In general, with higher molecular weight PVA's less PVA is required and with lower molecular weight PVA's, more PVA is required.

As appreciated in the art, the exact components and properties of components desired for any given ink application can vary, and, therefore, routine experimentation may be required to determine the optimal components and proportions of components for a given application and desired properties.

The pigments useful in the present invention, in addition to those specifically identified below, include those described in NP1RI Raw Materials Data, Vol. 4, Pigments, Copyright 1983. Conventional dispersing aids, biocides, defoamers and the like may be used in the present inks if desired for their known effects.

In a preferred embodiment of the invention, the water-dissipatable polymeric material comprises (a) an acid component (moiety) of from about 75 to about 84 mole % isophthalic acid and conversely from about 25 to about 16 mole % 5-sodiosulfoisophthalic acid, and (b) a glycol component (moiety) of from about 45 to about 60 mole % diethylene glycol and conversely from about 55 to about 40 mole % 1,4-cyclohexanedimethanol or ethylene glycol or mixtures thereof, and wherein the weight ratio of pigment material to said polymeric material is from about 1/10 to about 2/1. With regard to this polymeric material, the term "moiety" as used herein designates the residual portion of the reactant acid or glycol which actually enters into or onto the polymer chain during the condensation or polycondensation reaction.

Further preferred embodiments of the invention are as follows:

(a) the inherent viscosity of the water-dissipatable polymeric material is from about 0.28 to about 0.38, the said acid component (moiety) comprises from about 80 to about 83 mole % isophthalic acid and conversely from about 20 to about 17 mole % 5-sodiosulfoisophthalic acid, and said glycol component (moiety) comprises at least 15 mole % of a poly(ethylene glycol), especially diethylene glycol, more preferably at least 40 mole %; more preferred is that the glycol component (moiety) comprises from about 52 to about 56 mole % diethylene glycol and conversely from about 48 to about 44 mole % 1,4-cyclohexanedimethanol;

(b) the pigment is one or a mixture of the following color index materials according to their generic names: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; and C.I. Pigment Blue 15:3;

(c) the aqueous ink is coated or printed onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide, polyolefin especially polyethylene, or polystyrene; and (d) the coating or print comprises any of the above compositions wherein a substantial portion of the initial metal cations of the water solubilizing sulfonate groups of the polymeric material has been replaced with an insolubilizing polyvalent metal cation, such as $Al^{+3}$, $Ca^{++}$, or the like as disclosed and in the manner described in U.S. Pat. No. 4,145,469, the disclosure of which is incorporated herein by reference. As stated therein, generally, based on the weight of the polymeric material, 0.05% to about 2.0% by weight of the polyvalent metal cation is required for effective insolubilization.

The complete chemical definitions of the above C.I. pigments are given in the following table:

| Generic Name | Pigments C.A. Index/Chemical Name |
|---|---|
| C.I. Pigment Yellow 17 | Butanamide, 2,2'-[(3,3'-dichloro[1,1'-biphenyl]-4,4'-diyl)bis(azo)bis[N—(2-methoxyphenyl)-3-oxo- |
| C.I. Pigment Blue 27 | Ferrate(4–1), hexakis (cyano-C)—ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethyl-amino)-3-(ethylimino)-2,7-dimethyl-3H—xanthen-9-yl]-, ethyl ester, w/molybdenum tungsten hydroxide oxide phosphate |
| C.I. Pigment Red 81:3 | Benzoic acid, 2-[6-ethyl-amino)-3-ethylimino)-2,7-dimethyl-3H—xanthen-9-yl]-, ethyl ester, molybdate-silicate |
| C.I. Pigment Red 81:X | Benzoic acid, 2-[6-(ethyl-amino)-3-(ethylimino)-2,7-dimethyl-3H—xanthen-9-yl]-ethyl ester, molybdate-phosphate |
| C.I. Pigment Yellow 83 | Butanamide, 2,2'-[(3,3'-dichloro[1,1'-biphenyl]-4,4'-diyl)bis(azo)bis[N—(4-chloro-2,5-dimethoxyphenyl)-3-oxo- |
| C.I. Pigment Red 57:1 | 2-Naphthalenecarboxylic acid, 3-hydroxy-4-[(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)phenyl]-[4-(phenylimino)-2,5-cyclohexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N—[9-(2-carboxyphenyl)-6-(diethyl-amino)-3H—xanthen-3-ylidene]-N—ethyl-, molybdatetungstatephosphate |
| C.I. Pigment White 6 | Titanium oxide ($TiO_2$) |
| C.I. Pigment Blue 15 | Copper, [29H, 31H—phthalocyaninato (2-)-$N^{29}$, $N^{30}$, $N^{31}$, $N^{32}$]-, (Sp-4-1)- |
| C.I. Pigment Yellow 12 | Butanamide, 2,2'-[(3,3'-dichloro[1,1'-biphenyl)]-4,4'-diyl)bis(azo)]bis[3-oxo-N—phenyl- |
| C.I. Pigment Blue 56 | Benzenesulfonic acid, 2-methyl-4-[[4-[(3-methylphenyl)amino]phenyl]-[4-[(3-methylphenyl)-imino]-2,5-cyclohexadien-1-ylidene]methyl]-phenyl]amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N—(2-methylphenyl)-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H—phthalocyaninato (2-)-$N^{29}$, $N^{30}$, $N^{31}$, $N^{32}$]-, (SP-4-1)- |

The inherent viscosities (I.V.) of the particular polyester materials useful herein range from about 0.1 to about 1.0 determined according to ASTM D2857-70 procedure, in a Wagner Viscometer of Lab Glass, Inc. of Vineland, N.J., having a ½ ml. capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(n)_{0.50\%}^{25° C.} = \frac{\ln \frac{t_s}{t_o}}{C}$$

where:
- (n) = inherent viscosity at 25° C. at a polymer concentration of 0.25 g/100 ml. of solvent;
- ln = natural logarithm;
- $t_s$ = sample flow time;
- $t_o$ = solvent-blank flow time; and
- c = concentration of polymer in grams per 100 ml. of solvent = 0.25.

The units of the inherent viscosity throughout this application are in deciliters/gram. It is noted that higher concentrations of polymer, e.g., 0.50 g of polymer/100 ml solvent may be employed for more precise I.V. determinations.

In general, the water-dissipatable polyester materials useful in the present invention are excellent film formers for water based printing inks. The polymers form stable dispersions in water and produce tough, flexible films on drying. Films will form at temperatures down to just above the freezing point of water. The polymers in dispersion form may be plasticized if necessary, for example, with certain water immiscible phthalate esters to high degrees of flexibility. Printing inks prepared from the present concerntrates are readily further water reducible (diluted) and the finished or press-ready inks typically comprise in % by weight, from about 55 to about 90% water, preferably from about 65 to about 75% water, from about 4 to about 30% water-dissipatable polymer, preferably from about 10 to about 25% polymer, from about 1 to about 20% pigment, preferably from about 8 to about 15% pigment, and from about 0.05 to about 10.0% polyvinyl alcohol, preferably from about 0.05 to about 3.5% PVA. The inks dry rapidly upon printing, wet surfaces exceptionally well and have excellent adhesion to many plastic films and metal foil as well as to paper, glass, polyethylene and many other substrates. Both the 100% solids, water-dissipatable polymers and the corresponding aqueous dispersions thereof may be pigmented by conventional techniques, and the polyvinyl alcohol may be added prior to or during blending of the pigment with the 100% solids polymer or with its aqueous dispersion, or the PVA may be added to the pre-formed aqueous polymer-pigment dispersion by suitable mixing. It has been found that in addition to improved printing properties, the PVA can also act as a grinding aid. The prints have moderate water resistance upon heating and may be post-treated to produce films with excellent resistance to water, for example, with an aqueous alum solution or the like cation. In this regard, the use of deionized water in the present invention is preferred in order to prevent premature ion exchange on ink insolubilization.

The aforedescribed water-dissipatible polyester material is prepared according to the polyester preparation technology described in U.S. Pat. Nos.: 3,734,874; 3,779,993; and 4,233,196, the disclosures of which are incorporated herein by reference, and the use of the term "acid" in the above description and in the appended claims includes the various ester forming or condensable derivatives of the acid reactants such as the dimethyl esters thereof as employed in the preparations set out in these patents. Among the preferred sulfomonomers are those wherein the sulfonate group is attached to an aromatic nucleus such as benzene, naphthalene, diphenyl, or the like, or wherein the nucleus is cycloaliphatic such as in 1,4-cyclohexanedicarboxylic acid.

Dispersal of the present polyester material in water may be done, for example, at preheated water temperature of about a 180° to about 200° F. and the polymer added as pellets to the vortex under high shear stirring. A Cowles Dissolver, Waring Blender, or similar equipment may be used. Once the water is heated to temperature, additional heat input is not required. Depending upon the volume prepared, dispersal of the pellets by stirring should be complete within 15 to 30 minutes. Continued agitation with cooling may be desirable to prevent thickening at the surface due to water evaporation. Viscosities of the dispersions remain low up to nonvolatile levels of about 25-30%, but generally increase sharply above these levels. Viscosities of the dispersions will be influenced by the degree of polymer dispersion (fineness) obtained which is affected by the dispersing temperature, shear, and time.

The present concentrates and inks may also be prepared by milling, e.g., two-roll milling the finely comminuted, nonpolymer soluble pigment and PVA into the solid polyester material, and for the aqueous inks and semi-aqueous concentrates, thereafter dispersing the milled material in water in a manner generally similar to the procedure described in U.S. Pat. No. 4,148,779 for solubilizing organic disperse textile dyes in polyester for subsequent dispersal in water. Dispersions can also be made by adding the pigment at high speed agitation to the polyester material previously dispersed in water and then grinding in a ball mill or sand mill to further reduce pigment size. The presence of PVA during this operation is preferred. The preferred pH of the present inks is from about 5.0 to about 7.5.

The viscosities of the inks may, of course, range widely, e.g., from about 15 to about 60 seconds as measured in a #2 Zahn cup according to ASTM D-4212-82. The higher viscosities, e.g. from about 22 to about 60 seconds and lower water levels, e.g. from about 20 to about 55% represent semi-aqueous concentrated forms of the present inks. In this regard, in order to reduce the viscosities of these inks when necessary for certain printing apparatus and processes, varying amounts of water are added. In this water addition, the ink viscosity may be reduced, for example, up to about 60% of its original concentrate value, and the press-ready ink viscosity preferably ranges between about 15 and 30 seconds in a #2 Zahn cup.

The present invention also encompasses a substrate with the ink of the present invention printed thereon.

The present invention also encompasses a method for preparing the ink of the present invention comprising the steps of:

(a) dispersing said polymer material in water;

(b) adding said polyvinyl alcohol to the dispersion of (a) with agitation to obtain a substantially homogeneous mixture;

(c) adding said pigment of the mixture of (b) with agitation to form a pre-dispersion blend; and (d) grinding the blend of (c) to reduce the pigment particle size to less than about 6.0 on the NPIRI scale.

The following examples will further illustrate practice of the invention, but should not be interpreted as a limitation thereon. All percentages are by weight unless otherwise indicated.

POLYESTER PREPARATION

Example 1

A mixture of 79.5 g (0.41 mole) of dimethyl isophthalate, 26.6 g (0.09 mole) of dimethyl-5-sodiosulfoisophthalate, 54.1 g (0.51 mole) of diethylene glycol, 37.4 g (0.26 mole) of 1,4-cyclohexanedimethanol, 1.4 ml of a 1.0% (based on Ti) catalyst solution of titanium tetraisopropoxide, and 0.74 g (0.009 mole) of sodium acetate buffer is stirred and heated for two hours at 200°-220° C. The temperature is then raised to 275° C. and a vacuum of 0.3 mm is applied. Heating and stirring is continued for 1 hour under these conditions. After cooling, the polymer obtained has an I.V. of 0.36 and is dissipatable in his water to the extent of about 25 weight percent to give a clear, slightly viscous solution. The composition of the acid moieties of this polyester material is analyzed to be 82 mole % isophthalic acid residue and 18 mole % 5-sodiosulfoisophthalic acid residue, and of the glycol moieties is analyzed to be 54 mole % diethylene glycol and 46 mole % 1,4-cyclohexanedimethanol.

In accordance with the present invention, inks prepared from the above polyester material and including the PVA and polymer insoluble pigments, particularly highly colored pigments, have been found to be unexpectedly superior over prior aqueous inks in one or more of such properties as flow-out or printability, pigment wetting, pigment stability, temperature stability (heat and freeze-thaw), non-settling for extended periods of time, nonpolluting with respect to odor and volatile organics, nonflocculating, wide viscosity range inks, adhesion to a variety of substrates, hardness, gloss, drying rate on substrates, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, non-plugging of printing plates, flexibility, redispersibility or rewetting, crinkle resistance, high pigment loading, solvent resistance, alkali, chemical and detergent resistance, blocking resistance, lightfastness, toughness, substrate wetting, hold-out, dry-rate, and no offset on the printing press (coating, e.g. on tension rollers).

Example 2

Two hundred grams of C.I. Pigment Blue 56 presscake (28.5% solids in water), 299 grams of the polymer of Example 1 (32% polymer in water) and 1.0 gram of Surfynol 104E (50% by weight solution of 2,4,7,9-tetramethyl-5-decyn-4,7-diol in ethylene glycol) were ground in an Eiger Mill operated at about 5,000 rpm for about 5 minutes at a viscosity of 15.5 seconds measured in a #2 Zahn Cup at 25° C. according to ASTM D-4212-82. The grind has an NPIRI gauge of less than about "2". Proofs of this ink prepared with a flexographic hand proofer employing a 180 line anilox roll on uncoated paper and high slip polyethylene (corona discharge treated) showed very poor printability and color development.

Example 3

The ink of Example 2 was modified by the addition thereto by hand stirring of 0.5% by weight (about 2.5 grams) based on the ink weight of PVA having a viscosity of 40-50 CPS as measured as a 4% aqueous solution at 20° C., and a degree of hydrolysis of about 87-89%. Proofs of this ink prepared as in Example 2 gave vastly improved printability, smoothness, homogeneity and color development.

Example 4

The ink of Examnple 3 was printed onto high slip polyethylene one month after corona discharge treatment thereof and showed excellent printability, smoothness, homogeneity, color development and the like thereon.

Example 5

Several additional inks were made, each comprising 19.2 wt. % of the Example 1 polymer blended with 12 wt. % carbon black, PVA at concentrations of 0.15, 0.45, 0.75, 1.5, 2.25 and 3.0 wt. %, and the remainder being deionized water. These inks were coated onto aluminum foil, Mylar, polyethylene (corona discharge treated), newspaper, regular bond paper, PENOPAC, and Kraft paper with a flexographic hand proofer as in the previous examples and the coatings evaluated after drying at ambient temperatures. These experiments show that in general, the printability, adhesion and gloss of the coatings would improve as the concentration of the PVA were increased from about 0.05 to about 3.5, and most noticeably would improve in the concentration range of from about 0.2 to about 2.0.

Example 6

An ink was made comprising 15.3 wt. % of the Example 1 polymer, 11.9 wt. % Red Pigment C.I. 49:2, 0.5 wt. % "PVA 523" (~95% hydrolyzed), and the remainder being deionized water. This ink was coated as above onto aluminum foil, polyethylene (corona discharge treated), Mylar and coated paper. The results were essentially as observed above in Example 5.

Example 7

Polyesters designated (A), (B), (C) and (D) were prepared essentially in accordance with Example 1 of the aforementioned U.S. Pat. No. 4,233,196 from the following materials:

| (A) | g. moles |
|---|---|
| Dimethyl Isophthalate (IPA) | 0.415 |
| Dimethyl-5-Sodiosulfoisophthalate (SIP) | 0.085 |
| 1,4-Cyclohexanedimethanol (CHDM) | 0.520 |
| Carbowax 1000 (CW 1000) | 0.0273 |
| Sodium Acetate | 0.0085 |
| Irganox 1010 | 0.1 wt. % |

The Carbowax 1000 has the structure H(OCH$_2$—CH$_2$)$_n$OH wherein n is about 22. The polymer analyzed by NMR contains (in reacted form) about 83 mole % IPA, about 17 mole % SIP, about 94.5 mole % CHDM, and about 5.5 mole % of CW 1000, has an I.V.

of about 0.39. An ink was made comprising 12.3 wt. % of this polymer, 11.9 wt. % Red Pigment C.I. 49:2, 0.5 wt. % "PVA 523" (~95% hydrolyzed), and the remainder being deionized water. This ink was coated as above onto aluminum foil, polyethylene )corona discharge treated), Mylar and coated paper. The results were essentially as observed above in Example 5.

| (B) | g. moles |
|---|---|
| Dimethyl Isophthalate | 0.328 |
| Dimethyl-5-Sodiosulfoisophthalate | 0.072 |
| 1,4-Cyclohexanedimethanol | 0.442 |
| Carbowax 400 (n = 10) | 0.058 |
| Sodium Acetate | 0.0072 |

The polymer as analyzed by NMR contains (in reacted form) about 82 mole % IPA, about 18 mole % SIP, about 85.5 mole % CHDM and about 14.5 mole % CW 400, and has an I.V. of about 0.46.

| (C) | g. moles |
|---|---|
| Dimethyl Isophthalate | 0.41 |
| Dimethyl-5-Sodiosulfoisophthalate | 0.09 |
| 1,4-Cyclohexanedimethanol | 0.55 |
| Carbowax 4000 (n = 90) | 0.0005 |
| Sodium Acetate | 0.009 |

The polymer as analyzed by NMR contains (in reacted form) about 82 mole % IPA, about 18 mole % SIP, about 99.9 mole % CHDM and about 0.1 mole % CW 4000, and has an I.V. of about 0.16.

| (D) | g. moles |
|---|---|
| Dimethyl Isophthalate | 0.205 |
| Dimethyl-5-Sodiosulfoisophthalate | 0.045 |
| Ethylene Glycol (EG) | 0.9638 |
| Carbowax 2000 (n = 45) | 0.03625 |
| Sodium Acetate | 0.0045 |

The polymer as analyzed by NMR contains (in reacted form) about 82 mole % IPA, about 18 mole % SIP, about 85.5 mole % EG, and about 14.5 mole % CW 2000, and has an I.V. of about 0.34.

In these polymers containing the Carbowax material, the n value is preferably between about 6 and 150.

Inks prepared from these polyesters (B), (C) and (D) as for (A) show printing improvements for a variety of end uses.

Example 8

Demonstration of Improved Printability and Flexographic Transfer

I. Equipment and Instruments
1. RK Laboratory Proof Press
  Conditions
  180 line anilox
  11.2 BCM volume
  Dupont Cyrel solvent plates and Cyrel aqueous plates
  55 lb. clay-coated stock
  Doctor blade metering system
2. Hand-proofer—180 line anilox, Pamarco, Inc.
3. Macbeth RD 918 Densitometer
4. Cahn 5FA-211 (Surface Force Analyzer), Boekel Co.
5. #2 Zahn Cup Viscometer II. Raw Materials Pigments
1. Reflex Blue 3GPC, Code 15-2053, Hoechst
2. PV Fast Blue 2BGA (Phalocyanine Blue), Hoechst Polyvinyl Alcohol
1. Vinol 205
2. Vinol 523
3. Vinol 540

| Grade | Hydrolysis, % | Viscosity, CPS[1] | pH[2] | Volatiles, % Max. | Ash, % Max.[3] |
|---|---|---|---|---|---|
| Vinol 205 | 87.0–89.0 | 4–6 (Low) | 5–7 | 5 | 0.5 |
| Vinol 523 | 87.0–89.0 | 21–25 (Medium) | 5–7 | 5 | 0.3 |
| Vinol 540 | 87.0–89.0 | 40–50 (High) | 5–7 | 5 | 0.3 |

Polyester Dispersion
PM 10709

Formula
32.5% polyester having the same formula and prepared as in Example 1
0.6% Tektamer 38AD (biocide)
66.9% $H_2O$

[1] 4% aqueous solutions 20° C.
[2] 4% aqueous solutions.
[3] As % $Na_2O$, corrected volatiles.

Experimental

III. PREPARATIONS (1) Preparation of PVA Solutions $H_2O$ is added to a stirred vessel equipped with controlled heating and a condenser. The PVA powder is added with stirring. The temperature is increased to 80° C. for 1 hour to effect solution.

| | Formulations | % |
|---|---|---|
| (A) | Vinol 205 | 25% |
| | $H_2O$ | 75% |
| (B) | Vinol 523 | 15% |
| | $H_2O$ | 85% |
| (C) | Vinol 540 | 10% |
| | $H_2O$ | 90% |

(2) Preparation of Blue 3GPC Millbase
  General Procedure
  All ingredients were blended in a Waring Blender for 10 minutes at low speed (110V).

| Millbase # | Formulas Weight | Weight % | |
|---|---|---|---|
| #1 | 110.7 g | Blue 3GPC (27.1% Solids) | 10.0% Pigment |
| | 174.5 g | PM 10709 | 18.9% Polyester |
| | 14.8 g | $H_2O$ | 71.1% Water |
| #2 | 110.7 g | Blue 3GPC | 10.0% Pigment |
| | 174.3 g | PM 10709 | 18.9% Polyester |
| | 15.0 g | Vinol 540 (10%) | 0.5% PVA |
| #4 | 110.7 g | Blue 3GPC | 10.0% Pigment |
| | 159.3 g | PM 10709 | 17.3% Polyester |
| | 30.0 g | Vinol 540 (10%) | 1.0% PVA |
| #5 | 110.7 g | Blue 3GPC | 10.0% Pigment |
| | 121.6 g | PM 10709 | 13.17% Polyester |
| | 67.7 g | Vinol 205 (25%) | 5.6% PVA |
| #6 | 110.7 g | Blue 3GPC | 10.0% Pigment |
| | 60.0 g | Vinol 540 (10%) | 2.0% PVA |
| | 129.3 g | PM 10709 | 14.0% Polyester |
| #7 | 110.7 g | Blue 3GPC | 10.0% Pigment |
| | 3.0 g | Vinol 540 (10%) | 0.1% PVA |
| | 174.5 g | PM 10709 | 18.9% Polyester |
| | 11.8 g | $H_2O$ | 71.0% Water |
| #8 | 110.7 g | Blue 3GPC | 10.0% Pigment |

-continued

| Millbase # | Weight | Weight % | Formulas |
|---|---|---|---|
| | 7.5 g Vinol 540 (10%) | 0.25% | PVA |
| | 174.5 g PM 10709 | 18.9% | Polyester |
| | 7.3 g H$_2$O | | |
| #9 | 110.7 g Blue 3GPC | 10.0% | Pigment |
| | 45.0 g Vinol 540 (10%) | 1.5% | PVA |
| | 144.3 g PM 10709 | 15.6% | Polyester |
| #10 | 110.7 g Blue 3GPC | 10.0% | Pigment |
| | 22.5 g Vinol 540 | .75% | PVA |
| | 166.8 g PM 10709 | 18.1% | Polyester |
| #11 | 110.7 g Blue 3GPC | 10.0% | Pigment |
| | 10.0 g Vinol 523 (15%) | 0.5% | PVA |
| | 174.5 g PM 10709 | 18.9% | Polyester |
| | 4.8 g H$_2$O | 70.6% | Water |
| #12 | 110.7 g Blue 3GPC | 10.0% | Pigment |
| | 20.0 g Vinol 523 (15%) | 1.0% | PVA |
| | 169.3 g 10709 | 16.4% | Polyester |
| | | 72.6% | Water |
| #13 | 110.7 g Blue 3GPC | 10.0% | Pigment |
| | 40.0 g PVA 523 (15%) | 2.0% | PVA |
| | 149.3 g PM 10709 | 16.2% | Polyester |
| #14 | 110.7 g Blue 3GPC | 10.0% | Pigment |
| | 2.0 g PVA 523 (15%) | 0.1% | PVA |
| | 174.5 g PM 10709 | 18.9% | Polyester |
| | 12.8 g H$_2$O | 71.0% | Water |

(3) Preparation of Blue 2BGA (Phthalocyanine Blue) Millbase

| Weight % | Formulation Weight |
|---|---|
| 35% pigment | 7.0 lbs Hoechst Fast Blue 2BGA |
| 10% Polyester | 6.15 lbs PM 10709 |
| 55.0% H$_2$O | 6.85 lbs H$_2$O |

PM 10709 and H$_2$O were added to a 5 gallon bucket. The pigment was mixed into the liquids using an air driven stirrer. The slurry was passed through a Dispax DR3-616A In-line Disperser which was equipped with a fine, a medium, and a coarse generator for a total of 5 times.

Dispax Conditions

| Pass # | Time Per Pass | Temperature In | Temperature Out | Weight In | Weight Out |
|---|---|---|---|---|---|
| 1 | 1 min, 20 sec | 21° C. | 25° C. | 19.71 | 16.51 |
| 2 | 58 sec | — | 28° C. | 19.11 | 15.81 |
| 3 | 48.5 sec | — | 30° C. | 19.11 | 15.49 |
| 4 | 39.5 sec | — | 31° C. | 18.54 | 14.83 |
| 5 | 42 sec | — | 32° C. | 18.54 | 15.46 |

422 cps, #3 sp, 100 rpm, 33° C.
Density = 1.13 g/mL
pH = 6.90

The premix was passed through a 1.5 l Dyno-Mill three times. Conditions were as follows:
 Bead Loading—85% volume (1220 ml) 1mm glass beads
 Tip Speed—8m/sec
 Chamber Contact Time—4 min/pass
 Feed Rate—~200 g/min
 Product Temperature—60° C.
(4) Preparation of Blue 3GPC Inks

| Diluted Polyester Dispersion | Dry Formula |
|---|---|
| 61.5% PM 10709 | 20% Polyester |
| 38.5% H$_2$O | 80% H$_2$O |

The millbases were mixed 50/50 with the diluted polyester dispersion using an electric stirrer at low speed (10 minutes mixing time). The finished formulations are as follows:

| Sample # | Formulation |
|---|---|
| 162-1 (Control) | 5% Pigment |
| | 19.45% Polyester |
| 162-2 | 5% Pigment |
| | 19.45% Polyester |
| | 0.25% Vinol 540 |
| 162-4 | 5% Pigment |
| | 18.65% Polyester |
| | 0.5% Vinol 540 |
| 162-5 | 5% Pigment |
| | 16% Polyester |
| | 2.8% Vinol 205 |
| 162-6 | 5% Pigment |
| | 17% Polyester |
| | 1% Vinol 540 |
| 162-7 | 5% Pigment |
| | 0.05% Vinol 540 |
| | 19.45% Polyester |
| 162-8 | 5% Pigment |
| | 0.125% Vinol 540 |
| | 18.9% Polyester |
| 162-9 | 5% Pigment |
| | 0.75% Vinol 540 |
| | 17.8% Polyester |
| 162-10 | 5% Pigment |
| | 0.375% Vinol 540 |
| | 19.05% Polyester |
| 162-11 | 5% Pigment |
| | 19.45% Polyester |
| | 0.25% Vinol 523 |
| 162-12 | 5% Pigment |
| | 0.5% Vinol 523 |
| | 18.2% Polyester |
| 162-13 | 5% Pigment |
| | 1% Vinol 523 |
| | 18.1% Polyester |
| 162-14 | 5% Pigment |
| | 0.05% Vinol 523 |
| | 19.45% Polyester |

(5) Preparation of Blue 2BGA (Phthalocyanine Blue) Inks
 (A) Ink Concentrate Formula (Vinol 540): 500 g Blue 2BGA millbase (from (3)) 1240 g PM 10709 (polyester dispersion) 10 g H$_2$O
Mixed with low shear stirring 10 minutes Finished Formula:
 10% Pigment
 26% polyester
 67% H$_2$O
 (B) Press Ready Ink Formulas (Vinol 540):
 The mixtures below were stirred for 10 minutes with low shear mixing. The Vinol solutions are those shown above (Preparation of PVA Solutions).

| Sample # | Formulation | |
|---|---|---|
| 167-1 (Control) | 175 g ink concentrate from (A) above | 7% pigment + 18.2% polyester |
| | 75 g H$_2$O | |
| 167-2 | 175 g ink concentrate from (A) above | 7% pigment + 18.2% polyester |
| | 12.5 g Vinol 540 (10%) | 0.5% PVA |
| | 62.5 g H$_2$O | |
| 167-3 | 175 g ink concentrate | 7% pigment + |

-continued

| Sample # | Formulation | | |
|---|---|---|---|
| (Control) | | from (A) above | 18.2% polyester |
| | 75 g | Vinol 540 (10%) | 3% PVA |
| 167-4 | 175 g | ink concentrate | 7% pigment + |
| | | from (A) above | 18.2% polyester |
| | 50 g | Vinol 540 (10%) | 2% PVA |
| | 25 g | H$_2$O | |
| 167-5 | 175 g | ink concentrate | 7% pigment + |
| | | from (A) above | 18.2% polyester |
| | 25 g | Vinol 540 (10%) | 1% PVA |
| | 50 g | H$_2$O | |
| 167-6 | 175 g | ink concentrate | 7% pigment + |
| | | from (A) above | 18.2% polyester |
| | 37.5 g | Vinol 540 (10%) | 1.5% PVA |
| | 37.5 g | H$_2$O | |
| 167-7 | 175 g | ink concentrate | 7% pigment + |
| | | from (A) above | 18.2% polyester |
| | 31.25 g | Vinol 540 (10%) | 1.25% PVA |
| | 43.75 g | H$_2$O | |
| 167-8 | 175 g | ink concentrate | 7% pigment + |
| | | from (A) above | 18.2% polyester |
| | 18.75 g | Vinol 540 (10%) | 0.75% PVA |
| | 56.25 g | H$_2$O | |

(C) Ink Concentrate Formula (Vinol 205):

| | Sources |
|---|---|
| 9.6% Pigment | Blue 2BGA Millbase (from (3)) |
| 26.7% polyester | PM 10709 |
| 63.7% H$_2$O | |

(D) Press Ready Inks (Vinol 205)

The following inks were made by mixing with low shear stirring for 10 minutes. The formulations are as follows:

| Sample # | Formulation | | |
|---|---|---|---|
| 189-1 | 203.9 g | ink concentrate | 6.5% pigment + |
| | | from (C) above | 18.1% polyester |
| | 12.0 g | Vinol 205 (25%) | 1.0% PVA |
| | 84.1 g | H$_2$O | |
| 189-2 | 203.9 g | ink concentrate | 6.5% pigment + |
| | | from (C) above | 18.1% polyester |
| | 36.0 g | Vinol 205 (25%) | 3.0% PVA |
| | 60.1 g | H$_2$O | |
| 189-3 | 203.9 g | ink concentrate | 6.5% pigment + |
| | | from (C) above | 18.1% polyester |
| | 72.0 g | Vinol 205 (25%) | 6.0% PVA |
| | 24.1 g | H$_2$O | |
| 189-4 | 203.9 g | ink concentrate | 6.5% pigment + |
| | | from (C) above | 18.1% polyester |
| | 54.0 g | Vinol 205 (25%) | 4.5% PVA |
| | 42.1 g | H$_2$O | |
| 189-5 | 203.9 g | ink concentrate | 6.5% pigment + |
| | | from (C) above | 18.1% polyester |
| | 3.0 g | Vinol 205 (25%) | 0.25% PVA |
| | 93.1 g | H$_2$O | |
| 189-6 (Control) | 203.9 g | in concentrate from (C) above | 6.5% pigment + 18.1% polyester |
| | 96.1 g | H$_2$O | |
| 189-7 | 203.9 g | ink concentrate | 6.5% pigment + |
| | | from (C) above | 18.1% polyester |
| | 42.0 g | Vinol 205 (25%) | 3.5% PVA |
| | 54.1 g | H$_2$O | |
| 189-8 | 203.9 g | ink concentrate | 6.5% pigment + |
| | | from (C) above | 18.1% polyester |
| | 30.0 g | Vinol 205 (25%) | 2.5% PVA |
| | 66.1 g | H$_2$O | |
| 189-9 | 203.9 g | ink concentrate | 6.5% pigment + |
| | | from (C) above | 18.1% polyester |
| | 24.0 g | Vinol 205 (25%) | 2.0% PVA |
| | 72.1 g | H$_2$O | |

The following inks were made by using both the ink concentrate from (C) and inks from (D):

| Sample # | Formulation | | |
|---|---|---|---|
| 189-10 | 125 g | Ink (D) 189-2 | 6.5% pigment |
| | 118.5 g | ink concentrate from (C) above | 18.1% polyester 1.25% PVA |
| | 56.5 g | H$_2$O | |
| 189-11 | 50 g | Ink (D) 189-2 | 6.5% pigment |
| | 169.3 g | ink concentrate from (C) above | 18.1% polyester 0.5% PVA |
| | 80.7 g | H$_2$O | |
| 189-12 | 128.6 g | Ink (D) 189-7 | 6.5% pigment |
| | 116.7 g | ink concentrate from (C) above | 18.1% polyester 1.5% PVA |
| | 54.7 g | H$_2$O | |
| 189-13 | 64.3 g | Ink (D) 189-7 | 6.5% pigment |
| | 116.7 g | ink concentrate from (C) above | 18.1% polyester 0.75% PVA |
| | 76.1 g | H$_2$O | |
| 189-14 | 87.5 g | Ink (D) 189-3 | 6.5% pigment |
| | 143.9 g | ink concentrate from (C) above | 18.1% polyester 1.75% PVA |
| | 68.6 g | H$_2$O | |

IV. Evaluations

Printability on Polyethylene Film

The press ready inks were handproofed onto polyethylene. The optical density of each printed film was measured using a Macbeth Densitometer. The increase in optical density was determined as follows:

$$\frac{\text{(Optical Density of Sample} - \text{Optical Density of Control)}}{\text{Optical Density of Control}} \times 100 = \% \text{ Increase in Optical Density}$$

Viscosity

The viscosity of an ink was determined by measuring the time it took to empty from a #2 Zahn Cup at room temperature. The value is expressed in seconds.

Surface Tension

The surface tension of an ink was measured using a Cahn Surface Force Analyzer (SFA-211).

Flexographic Transfer

The improvement in flexo transfer was measured by printing the inks on 55 lb. clay-coated stock (paper) using a RK Laboratory Proof Press.

Press Conditions
180 line anilox
11.2 BCM volume
Dupont Cyrel Plates
Doctor Blade Metering System The optical density of the prints were measured. The improvement in transfer was described by the increase in optical density:

Increase in Optical Density =

$$\frac{\text{(Optical Density of Sample} - \text{Optical Density of Control)}}{\text{Optical Density of Control}} \times 100$$

IV. Results

Printability on Polyethylene

The results showed that Vinol 540 and Vinol 523 (Tables 3 and 4) which are high and medium molecular weight polyvinyl alcohols are both active at concentrations of 0.05% on weight of the total ink. Vinol 205, a lower molecular weight PVA, starting at about 0.5% on weight of the total showed an increase in optical density (Table 6). This result is particularly unexpected in view of the surface tension. Lowering the surface tension to less than 40 dynes/cm would help wetting on polyethylene which usually has a surface energy of between 30–39 dynes/cm. The polyethylene used in this Example had a surface energy of about 37–39 dynes/cm. However, since the surface tensions of these inks are ~50 dynes/cm, wetting would not be predicted for any of them.

Improvement in Flexographic Transfer

Flexographic transfer is improved where viscosity and surface tension are not measurably different (Tables 1, 2 and 5).

TABLE 1

Effect of Vinol 540 Concentration on Flexographic Transfer (High Molecular Weight PVA)

| Sample # | Concentration, % Wt. on Total Ink | | Concentration, % Wt. on Polymer Solids | | Viscosity, Sec. #2 Zahn | Surface Tension, Dynes/cm | Increase[1] Optical Density, % |
| --- | --- | --- | --- | --- | --- | --- | --- |
| | Polyester | Vinol 540 | Polyester | Vinol 540 | | | |
| 162-1 (Control) | 19.45 | 0.000 | 100.0 | 0.0 | 16 | 55.16 | 0.0 |
| 162-7 | 19.45 | 0.050 | 99.7 | 0.3 | 15 | 54.34 | 13.4 |
| 162-2 | 19.45 | 0.250 | 98.7 | 1.2 | 16 | 51.70 | 17.4 |
| 162-10 | 19.05 | 0.375 | 98.0 | 2.0 | 17 | 54.95 | 41.9 |
| 162-8 | 18.90 | 0.125 | 99.3 | 0.7 | 16 | 52.92 | 9.2 |
| 162-4 | 18.65 | 0.500 | 97.4 | 2.6 | 17 | 51.49 | 45.0 |
| 162-9 | 17.80 | 0.750 | 96.0 | 4.0 | 20 | 50.10 | 55.3 |
| 162-6 | 17.00 | 1.000 | 94.4 | 5.6 | 24 | 53.53 | 56.3 |

[1](Optical Density of Sample − Optical Density of Control)/Optical Density of Control × 100
Notes: Pigment is Reflex Blue 3GPC.
Samples are printed on clay-coated paper.

TABLE 2

Effect of Vinol 523 Concentration on Flexographic Transfer (Medium Molecular Weight PVA)

| Sample # | Concentration, % Wt. on Total Ink | | Concentration, % Wt. on Polymer Solids | | Viscosity, Sec. #2 Zahn | Surface Tension, Dynes/cm | Increase[1] Optical Density, % |
| --- | --- | --- | --- | --- | --- | --- | --- |
| | Polyester | Vinol 523 | Polyester | Vinol 523 | | | |
| 162-1 (Control) | 19.45 | 0.00 | 100.0 | 0.0 | 16 | 55.16 | 0.0 |
| 162-11 | 19.45 | 0.25 | 98.7 | 1.3 | 17 | 49.86 | 27.6 |
| 162-14 | 19.45 | 0.05 | 99.7 | 0.3 | 16 | 54.34 | 9.2 |
| 162-12 | 18.20 | 0.50 | 97.3 | 2.7 | 18 | 52.30 | 46.0 |
| 162-13 | 18.10 | 1.00 | 94.8 | 5.2 | 25 | 48.85 | 58.2 |

[1](Optical Density of Sample − Optical Density of Control)/Optical Density of Control × 100
Notes: Pigment is Reflex Blue 3GPC.
Samples are printed on clay-coated paper.

TABLE 3

Printability on Polyethylene as a Function of Vinol 540 Concentration (High Molecular Weight PVA)

| Sample # | Concentration on Wt. Polymer Solids, % | | Concentration on Wt. Total Ink, % | | Viscosity, Sec. #2 Zahn | Surface Tension, Dynes/cm | Increase[1] Optical Density, % |
| --- | --- | --- | --- | --- | --- | --- | --- |
| | Polyester | Vinol 540 | Polyester | Vinol 540 | | | |
| 162-1 (Control) | 100.0 | 0.0 | 19.45 | 0.000 | 16 | 55.16 | 0.0 |
| 162-7 | 99.7 | 0.3 | 19.45 | 0.050 | 15 | 54.34 | 326.3 |
| 162-8 | 99.3 | 0.7 | 18.90 | 0.125 | 16 | 52.92 | 636.8 |
| 162-2 | 98.7 | 1.3 | 19.45 | 0.250 | 16 | 51.70 | 747.4 |
| 162-10 | 98.0 | 2.0 | 19.05 | 0.375 | 17 | 54.95 | 726.3 |
| 162-4 | 97.4 | 2.6 | 18.65 | 0.500 | 17 | 51.49 | 757.9 |
| 162-9 | 96.0 | 4.0 | 17.80 | 0.750 | 20 | 50.10 | 678.9 |
| 162-6 | 94.4 | 5.6 | 17.00 | 1.000 | 24 | 53.53 | 736.8 |

[1]% Increase in Optical Density = $\frac{\text{Optical Density Sample} - \text{Optical Density Control}}{\text{Optical Density Control}} \times 100$
Note: Pigment is Reflex Blue 3GPC.

TABLE 4

Printability of Polyethylene as a Function of Vinol 523 Concentration
(Medium Molecular Weight PVA)

| Sample # | Concentration on Wt. Polymer Solids, % Polyester | Concentration on Wt. Polymer Solids, % Vinol 540 | Concentration on Wt. Total Ink, % Polyester | Concentration on Wt. Total Ink, % Vinol 540 | Viscosity, Sec. #2 Zahn | Surface Tension, Dynes/cm | Increase[1] Optical Density, % |
|---|---|---|---|---|---|---|---|
| 162-1 (Control) | 100.0 | 0.0 | 19.45 | 0.00 | 16 | 55.16 | 0.0 |
| 162-14 | 99.7 | 0.3 | 19.45 | 0.05 | 16 | 54.34 | 157.9 |
| 162-11 | 98.7 | 1.3 | 19.45 | 0.25 | 17 | 49.86 | 663.2 |
| 162-12 | 97.3 | 2.7 | 18.20 | 0.50 | 18 | 52.30 | 663.2 |
| 162-13 | 94.8 | 5.2 | 18.10 | 1.00 | 25 | 48.85 | 715.8 |

[1] % Increase in Optical Density = $\frac{\text{Optical Density Sample} - \text{Optical Density Control}}{\text{Optical Density Control}} \times 100$ Note: Pigment is Reflex Blue 3GPC.

TABLE 5

Effect of Vinol 540 on AQ Ink Properties
(High Molecular Weight PVA)

| Sample # | Concentration on Wt. Total Ink, % Vinol 540 | Concentration on Wt. Total Ink, % Polyester | Surface Tension, Dynes/cm | Viscosity, Sec. #2 Zahn | Increase in Optical Density, %[1] Flexo Printing on Polyethylene | Increase in Optical Density, %[1] Flexo Printing on Paper |
|---|---|---|---|---|---|---|
| 167-1 (Control) | 0.00 | 18.2 | 54.75 | 18.0 | 0.0 | 0.0 |
| 167-2 | 0.50 | 18.2 | 50.88 | 18.4 | 614.3 | 79.2 |
| 167-8 | 0.75 | 18.2 | 49.86 | 26.2 | 800.0 | 112.5 |
| 167-5 | 1.00 | 18.2 | 48.44 | 35.2 | 735.0 | 143.8 |
| 167-7 | 1.25 | 18.2 | 49.86 | 51.0 | 857.1 | 170.8 |
| 167-6 | 1.50 | 18.2 | 47.62 | 65.8 | 935.7 | 185.4 |
| 167-4 | 2.00 | 18.2 | 42.94 | TT[2] | 900.0 | 175.0 |
| 167-3 | 3.00 | 18.2 | 36.02 | TT | 957.1 | 139.6 |

[1] % Increase in Optical Density = $\frac{\text{Optical Density Sample} - \text{Optical Density Control}}{\text{Optical Density Control}} \times 100$

[2] TT = too thick to measure

Note: Pigment is Blue 2BGA (Phthalocyanine Blue).

TABLE 6

Effect of Vinol 205 on AQ 55 Inks
(Low Molecular Weight PVA)

| Sample # | Concentration on Wt. Total Ink, % Polyester | Concentration on Wt. Total Ink, % Vinol 205 | Concentration on Wt. Polymer Solids, % Polyester | Concentration on Wt. Polymer Solids, % Vinol 205 | Viscosity, Sec. #2 Zahn | Increase in Optical Density, %[1] Flexo Printing on Paper | Increase in Optical Density, %[1] Flexo Printing on Polyethylene |
|---|---|---|---|---|---|---|---|
| 189-6 (Control) | 18.1 | 0.00 | 100.00 | 0.00 | 18.0 | 0.0 | 0.0 |
| 189-5 | 18.1 | 0.25 | 98.64 | 1.36 | 18.0 | 22.2 | −14.1 |
| 189-11 | 18.1 | 0.50 | 97.31 | 2.69 | 18.0 | 59.3 | 66.5 |
| 189-13 | 18.1 | 0.75 | 96.02 | 3.98 | 19.5 | 61.1 | 119.4 |
| 189-1 | 18.1 | 1.00 | 94.76 | 5.24 | 24.0 | 77.8 | 91.8 |
| 189-10 | 18.1 | 1.25 | 93.19 | 6.81 | 26.0 | 98.1 | 413.5 |
| 189-12 | 18.1 | 1.50 | 91.94 | 8.07 | 31.0 | 120.4 | 358.8 |
| 189-14 | 18.1 | 1.75 | 91.18 | 8.82 | 38.0 | 131.5 | 209.4 |
| 189-9 | 18.1 | 2.00 | 90.05 | 9.95 | 47.0 | 118.5 | 372.4 |
| 189-8 | 18.1 | 2.50 | 87.86 | 12.14 | 75.0 | 140.7 | 576.5 |
| 189-2 | 18.1 | 3.00 | 85.78 | 14.22 | TT[2] | — | 570.6 |
| 189-7 | 18.1 | 3.50 | 83.80 | 16.20 | TT | — | 658.8 |
| 189-4 | 18.1 | 4.50 | 80.08 | 19.91 | TT | — | 564.7 |
| 189-3 | 18.1 | 6.00 | 75.10 | 24.90 | TT | — | 770.6 |

[1] % Increase in Optical Density = $\frac{\text{Optical Density Sample} - \text{Optical Density Control}}{\text{Optical Density Control}} \times 100$

[2] TT = too thick to measure

Note: Pigment is Blue 2BGA (Phthalocyanine Blue).

The invention has been described in detail with particular reference to preferred embodiments thereof, but it will be understood that variations and modifications can be effected within the spirit and scope of the invention.

We claim:

1. A composition useful as a printing ink or concentrate thereof comprising a substantially homogeneous system of the components:
   (1) from about 4 to about 80 weight % of polymeric material of at least one linear, water-dissipatable polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/ tetrachloroethane at 25° C. and at a concentration of 0.25 gram of polymer in 100 ml of the solvent, the polymer containing substantially equimolar proportions of carboxylic acid equivalents (100 mole percent) to hydroxy and amino equivalents (100 mole percent), the polymer comprising the reaction products of (a), (b), (c) and (d) from the following reactants or ester forming or esteramide forming derivatives thereof;

(a) at least one difunctional dicarboxylic acid;

(b) from about 4 to about 25 mole percent, based on a total of all acid, hydroxyl and amino equivalents being equal to 200 mole percent, of at least one difunctional sulfomonomer containing at least one metal sulfonate group attached to an aromatic or cycloaliphatic nucleus wherein the functional groups are hydroxy, carboxyl or amino;

(c) at least one difunctional reactant selected from a glycol or a mixture of a glycol and diamine having two —NRH groups, the glycol containing two —CH$_2$—OH groups of which (1) at least 15 mole percent based on the total mole percent of hydroxy or hydroxy and amino equivalents, is a poly(ethylene glycol) having the structural formula $$H{-}(OCH_2{-}CH_2)_n{-}OH,$$

n being an integer of from 2 to about 20, or (2) of which from about 0.1 to less than about 15 mole percent based on the total mole percent of hydroxy or hydroxy and amino equivalents, is a poly(ethylene glycol) having the structural formula $$H{-}(OCH_2{-}CH_2)_n{-}OH,$$

n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —C(R)$_2$—OH group, an aminocarboxylic acid having one —NRH group, and an aminoalcohol having one —C(R)$_2$—OH group and one —NRH group, or mixtures of said difunctional reactants;

wherein each R in the (c) or (d) reactants is a H atom or an alkyl group of 1 to 4 carbon atoms;

(2) from about 1 to about 60 weight % of pigment material;

(3) from substantially none to about 90 weight % of water; and (4) from about 0.05 to about 30.0 weight % of polyvinyl alcohol, wherein said ink, when printed by a flexographic process onto polyethylene having a surface energy of about 37–39 dynes/cm, has improved printability relative to a control ink without polyvinyl alcohol such that said ink has an increase in optical density relative to the control ink on said polyethylene of at least 100% wherein increase in optical density =

$$\frac{\text{(optical density of ink} - \text{optical density of control ink)}}{\text{optical density of control ink}} \times 100.$$

2. The composition of claim 1 wherein the n value of reactant (c) is between 2 and about 20.

3. The composition of claim 2 wherein the polymeric material comprises one or more polyester materials having an inherent viscosity of from about 0.28 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof, and the pigment material is present in a weight ratio with respect to total polyester materials of from about 1/10 to about 2/1.

4. The composition of claim 3 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

5. The composition of claim 4 wherein the weight ratio of water to polyvinyl alcohol is from about 85 to about 180.

6. The composition of any one of claims 1-5 wherein the pigment is one or a mixture of the following color index materials: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; and C.I. Pigment Blue 15:3.

7. The composition of claim 6 wherein said increase in optical density is at least 500%.

8. The composition of claim 6 wherein the polymeric material comprises from about 4 to about 30 weight %, the pigment material comprises from about 1 to about 20 weight %, the water comprises from about 55 to about 90 weight %, and the polyvinyl alcohol comprises from about 0.01 to about 10.0 weight %.

9. The composition of claim 6 wherein the polymeric material comprises from about 10 to about 25 weight %, the pigment material comprises from about 8 to about 15 weight %, the water comprises from about 65 to about 75 weight %, and the polyvinyl alcohol comprises from about 0.05 to about 3.5 weight %.

10. The composition of claim 9 wherein the polyvinyl alcohol comprises from about 0.2 to about 2.0 weight %.

11. The composition of claim 6 coated onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidiene chloride), polyamide, polyolefin, or polystyrene.

12. The composition of claim 8 coated onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidiene chloride), polyamide, polyolefin, or polystyrene.

13. The composition of claim 9 coated onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidiene chloride), polyamide, polyolefin, or polystyrene.

14. A substantially water-insoluble coating or print on a substrate according to claim 11 wherein substantially all water has evaporated and a substantial portion of the initial metal cations of the water solubilizing sulfonate groups of the polymeric material has been replaced with an in-solubilizing cation.

15. The method for preparing the aqueous composition of claim 1 comprising the steps of:
    (a) dispersing said polymeric material in water;
    (b) adding said polyvinyl alcohol to the dispersion of (a) with agitation to obtain a substantially homogeneous mixture;
    (c) adding said pigment to the mixture of (b) with agitation to form a pre-dispersion blend; and
    (d) grinding the blend of (c) to reduce the pigment particle size to less than about 6.0 on the NPIRI scale.

* * * * *